United States Patent
Takai et al.

(10) Patent No.: US 7,005,819 B2
(45) Date of Patent: Feb. 28, 2006

(54) CONTROL APPARATUS FOR CONTROLLING TRACTION MOTOR EQUIPPED IN VEHICLE

(75) Inventors: Takatoshi Takai, Anjo (JP); Takeshi Ito, Nagoya (JP); Hiroya Tsuji, Yokkaichi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/146,155

(22) Filed: Jun. 7, 2005

(65) Prior Publication Data

US 2005/0269983 A1    Dec. 8, 2005

(30) Foreign Application Priority Data

Jun. 7, 2004    (JP)    .............................. 2004-168609

(51) Int. Cl.
*H02P 7/00* (2006.01)

(52) U.S. Cl. ...................... 318/432; 318/434; 318/727; 318/254; 180/65.1

(58) Field of Classification Search ................ 318/727, 318/254, 138, 439, 432–434; 180/65.1, 65.8
See application file for complete search history.

(56) References Cited

U.S. PATENT DOCUMENTS

| | | | | |
|---|---|---|---|---|
| 4,023,083 A | * | 5/1977 | Plunkett | 318/802 |
| 5,345,155 A | * | 9/1994 | Masaki et al. | 318/138 |
| 5,583,406 A | * | 12/1996 | Mutoh et al. | 318/376 |
| 5,739,664 A | * | 4/1998 | Deng et al. | 318/808 |
| 5,925,993 A | * | 7/1999 | Lansberry | 318/139 |
| 6,264,005 B1 | * | 7/2001 | Kang et al. | 187/290 |

FOREIGN PATENT DOCUMENTS

| | | |
|---|---|---|
| JP | A 2001-263148 | 9/2001 |
| JP | A 2003-9573 | 1/2003 |
| JP | A 2003-204604 | 7/2003 |

\* cited by examiner

*Primary Examiner*—Rina Duda
(74) *Attorney, Agent, or Firm*—Oliff & Berridge, PLC (57) ABSTRACT

A motor control apparatus calculates a current command value based on a torque command value and a rotational speed of the traction motor, and calculates a voltage command value based on a difference between a detected current of a traction motor and the current command value so as to reduce the difference to 0. In addition, the motor control apparatus calculates a preferable voltage range of the traction motor with reference to the torque command value and a motor speed, and performs a feedback control so that the voltage value supplied to the traction motor is within this preferable voltage range.

16 Claims, 6 Drawing Sheets

VOLTAGE LIMIT MAP
(INVERTER VOLTAGE: CONSTANT)

FIG. 9

VOLTAGE LIMIT MAP
(TORQUE: CONSTANT)

CONTROL APPARATUS FOR CONTROLLING TRACTION MOTOR EQUIPPED IN VEHICLE

CROSS-REFERENCE TO RELATED APPLICATION

This application is based upon and claims the benefit of priority from earlier Japanese Patent Application No. 2004-168609 filed on Jun. 7, 2004 so that the description of which is incorporated herein by reference.

BACKGROUND OF THE INVENTION

The present invention relates to a control apparatus for controlling a traction motor equipped in an vehicle, such as an electric car and a hybrid car, the traction motor generating a driving torque necessary for running the automobile.

Hybrid vehicles and electric vehicles driven by secondary cells or fuel cells are representative vehicles using an electromotive torque.

To realize a vehicle traveling control based on control of this kind of traction motor, a traction motor equipped vehicle usually includes a motor control apparatus and a vehicle electronic control apparatus (i.e. a vehicle ECU). The motor control apparatus is capable of controlling a motor voltage applied to a traction motor (i.e. an AC motor). The vehicle electronic control apparatus is capable of calculating a torque command value based on information entered from an accelerator pedal and a brake pedal and transmitting the calculated torque command value to the motor control apparatus. Furthermore, the motor control apparatus has a current command value calculating section, a voltage command value calculating section, and an inverter section. The current command value calculating section calculates a current command value based on a torque command value and a rotational speed of the traction motor. The voltage command value calculating section calculates a voltage command value based on a difference between a detect current of the traction motor and a current command value, and outputs the calculated voltage command value to the traction motor so as to reduce the difference to 0. The inverter section applies a motor voltage corresponding to the calculated voltage command value to the traction motor. This kind of motor control apparatus is, for example, disclosed in the Japanese patent application laid-open No. 2003-009573.

However, according to the above-described conventional vehicle using an electromotive torque, if a traction load entered to wheels of the vehicle suddenly changes, drivability of the vehicle will be worsened due to an abrupt change in the output, especially in the rotational speed, of the traction motor driving these wheels.

Furthermore, according to the conventional vehicle using an electromotive torque, the vehicle ECU calculates a required torque command value in accordance with a vehicle speed or a motor speed and transmits the calculated torque command value to the motor control apparatus. Then, the motor control apparatus executes a current feedback control for equalizing a motor current to a current command value corresponding to the torque command value received from the vehicle ECU, so as to cause the motor to generate a torque corresponding to the torque command value. Therefore, in the event that the traction load has abruptly changed as described above, it is necessary to modify the torque command value produced from the vehicle ECU so as to compensate a caused difference. However, in this case, there is a significant delay in time (approximately 20 ms) required for calculations performed in the vehicle ECU and in the motor control apparatus and also for mutual communications between them. As a result, the motor speed suddenly changes and the drivability will be worsened.

SUMMARY OF THE INVENTION

In view of the above-described problems, the present invention has an object to provide a vehicle using an electromotive torque and capable of adequately maintaining the drivability of a vehicle irrespective of a sudden change in the traction load.

In order to accomplish the above and other related objects, the present invention provides a vehicle using an electromotive torque which includes a traction motor, such as an AC motor, generating a driving torque, a motor control apparatus for controlling a motor voltage applied to the traction motor, and a vehicle electronic control apparatus which calculates a torque command value based on information entered from an accelerator pedal and transmits the torque command value to the motor control apparatus. The motor control apparatus includes a control portion and an inverter section. The control portion calculates a current command value based on the torque command value and a rotational speed of the traction motor, and also calculates a voltage command value based on a difference between a detected current of the traction motor and the current command value so as to reduce the difference to 0. The inverter section applies a motor voltage corresponding to the calculated voltage command value to the traction motor. The motor control apparatus memorizes a relationship between a predetermined electric amount relating to driving conditions of the traction motor and a preferable voltage range of the traction motor. The motor control apparatus calculates this preferable voltage range of the traction motor based on the electric amount being entered or calculated and the memorized relationship. And, the motor control apparatus regulates the voltage command value within the preferable voltage range.

Namely, this invention performs a feedback control for regulating the voltage command value produced from the motor control apparatus within the preferable voltage range, thereby regulating the voltage of the traction motor. The preferable voltage range is a function value defined based on an electric parameter of the traction motor relating to driving conditions of the traction motor.

According to this arrangement, even when the vehicle traction load (i.e. wheel load) suddenly changes, the motor voltage and the motor output do not cause undesirable changes. Thus, this invention brings the effect of adequately preventing the vehicle drivability from lessening due to a sudden change of the traction load. Namely, this invention enables the traction motor to have excellent follow-up characteristics against variations of driving commands.

More specifically, the abrupt change in traction load induces a change of counter electromotive force, i.e. motional electromotive force, in the rotational speed change of the traction motor. The traction motor is equivalent to a serial circuit consisting of a motor impedance component and a counter electromotive force source. Thus, a change in the counter electromotive force induces a change in the motor voltage (i.e. the input voltage of the motor). For example, when the traction load suddenly reduces, the motor voltage suddenly reduces. When the motor voltage suddenly reduces, the motor output suddenly reduces. However, the motor voltage inherently converges to a predetermined voltage range according to a motor voltage command corresponding to the torque command value and motor driving conditions (e.g. motor speed). Therefore, in a case that the motor voltage is out of this predicted voltage range (i.e. preferable voltage range), it can be regarded that this has been caused by an abrupt change in the motional electromotive force of the motor in response to an abrupt change in the traction load. Thus, the drivability of an automotive vehicle can be improved by suppressing undesirable abrupt changes in the motor voltage (usually expressed by 'V') or in the motor output (usually expressed by P=Tω, where T represents a motor torque and ω represents an angular rate).

According to a preferable embodiment of the present invention, the electric amount includes an electric amount representing the rotational speed of the traction motor or an electric amount associated with the rotational speed of the traction motor. With this arrangement, the motor control can adequately involve the motor voltage changing in response to the rotational speed of the traction motor. The above-described effects of the present invention can be further enhanced.

According to a preferable embodiment of the present invention, the electric amount includes an electric power suppliable to the traction motor and the electric amount representing the rotational speed of the traction motor. With this arrangement, even when the traction load suddenly changes, the electric power consumption in the motor (i.e. a product of the motor voltage and the motor current) can be prevented from exceeding the electric power suppliable to the traction motor. Thus, the battery is not subjected to excessive loads.

According to a preferable embodiment of the present invention, the electric amount includes the torque command value entered from the vehicle electronic control apparatus and the electric amount representing the rotational speed of the traction motor. In general, the torque command value and the rotational speed of traction motor, when multiplied as a product, represent a traction power of the motor, i.e. a physical quantity relating to electric power consumption in the motor. Thus, regulating the motor voltage to its preferable voltage range makes it possible to regulate the electric power consumption in the motor within a preferable range. Thus, in addition to the effect of preventing the drivability of an automotive vehicle from being lessened due to an abrupt change of the electric power consumption in the motor, this arrangement can prevent the load of a power source system from increasing due to an increase of the electric power consumption in the motor.

According to a preferable embodiment of the present invention, the electric amount includes the torque command value, the electric amount representing the rotational speed of the traction motor, and a power source voltage of the inverter section. With this arrangement, in addition to the torque command value and the rotational speed of the traction motor which are electric amounts relating to the mechanical power of the motor, the motor control can involve the power source voltage of the inverter section as an electric amount relating to electric power consumption in the motor. Thus, in addition to the effect of preventing the drivability of an automotive vehicle from being lessened due to an abrupt change of the electric power consumption in the motor, this arrangement can prevent the load of the power source system from increasing due to an increase of the electric power consumption in the motor.

According to a preferable embodiment of the present invention, the control portion adjusts a q-axis current command value of the current command value when the motor voltage is out of the preferable voltage range, so that the motor voltage can return to the preferable voltage range.

With this arrangement, it becomes possible to provide a simplified control capable of reducing a required calculation amount and also provide a traction motor capable of accurately preventing its voltage from excessively increasing or decreasing. Thus, the electric power consumption in the motor and the driving power generated by the motor cause no abrupt changes. Thus, the drivability of an automotive vehicle is not lessened due to an abrupt change in the traction load.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

A vehicle equipped with a traction motor in accordance with preferable embodiments of the present invention will be explained hereinafter, although the present invention is not limited to these embodiments and can be variously modified within the scope of the present invention.

Circuit Arrangement

A traction motor control system for a traction motor equipped vehicle will be explained with reference to a block diagram shown in FIG. 1.

Figure 1:
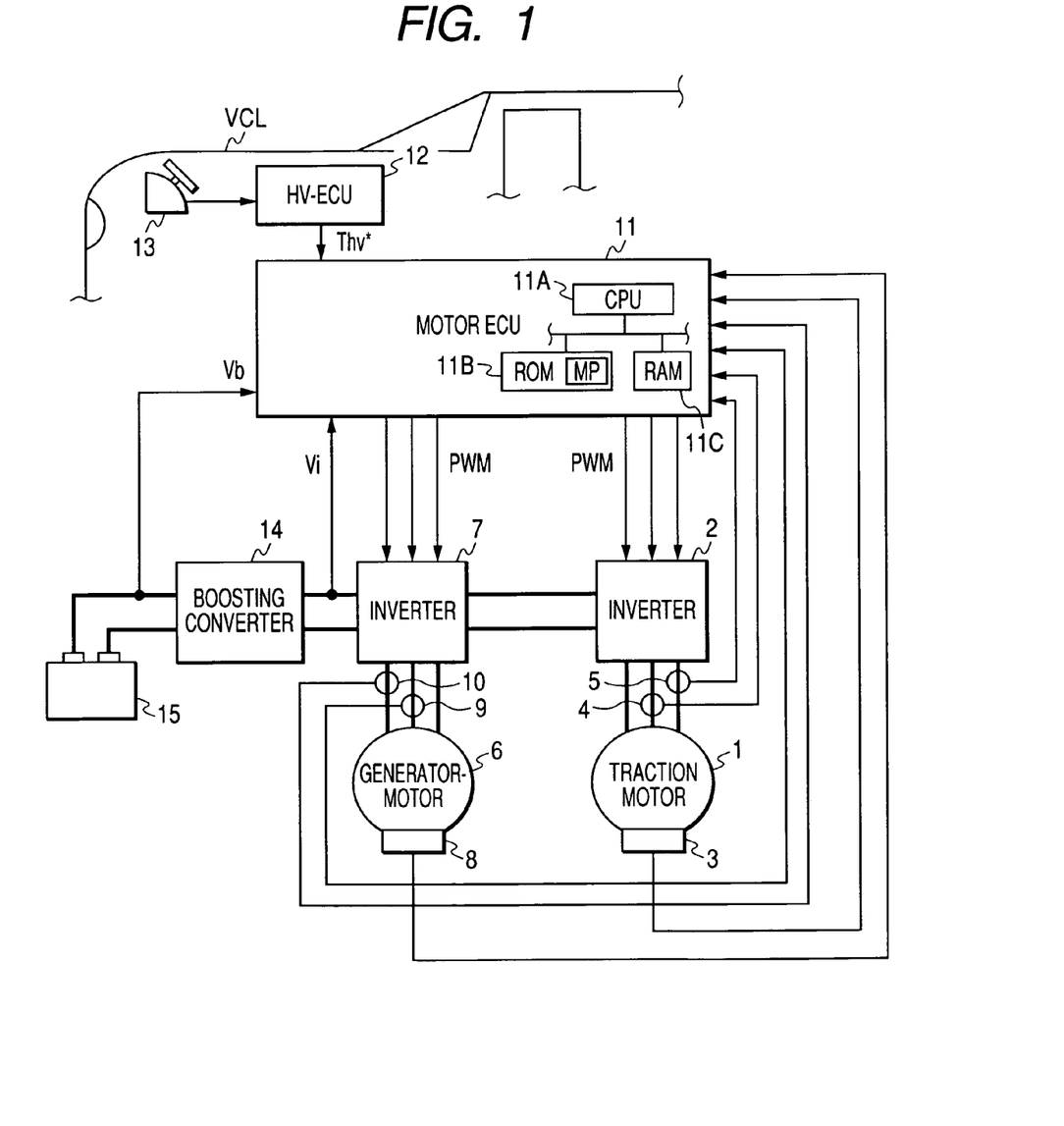
FIG. 1 is a block diagram showing an electric system for a vehicle equipped with a traction motor in accordance with a preferred embodiment of the present invention.

FIG. 1 exemplifies an overall arrangement of an electric system mounted in a vehicle VCL, such as an electric car and a hybrid car. This electric system functionally includes a control apparatus according to the present invention and controls a traction motor equipped in the vehicle.

To be specific, the electronic system in the vehicle VCL includes a traction motor 1, a first inverter 2, a rotor rotational position detector 3, current sensors 4 and 5, a generator-motor 6, a second inverter 7, a rotational angle sensor 8, current sensors 9 and 10, a motor ECU (i.e. motor electronic control unit) 11, a vehicle ECU (i.e. vehicle electronic control unit, which is hereinafter referred to as HV-ECU) 12, an accelerator pedal 13, a boosting converter 14, and a battery 15. Of these the HV-ECU 12, motor ECU 11, boosting converter 14, inverter 2 functionally compose the control apparatus according to the present invention.

The traction motor 1 is arranged by a three-phase brushless motor connected to wheels of an automotive vehicle. The first inverter 2 is a three-phase and bidirectional inverter which is capable of giving or receiving electric power to or from the traction motor 1. The rotor rotational position detector 3 detects a rotational position of a rotor of the traction motor 1. The current sensors 4 and 5 detect phase currents of the traction motor 1, respectively.

The generator-motor 6 is arranged by a three-phase brushless motor connected to an engine. The second inverter 7 is a three-phase and bidirectional inverter which is capable of giving or receiving electric power to or from the generator-motor 6. The rotational angle sensor 8 detects a rotational position of a rotor of the generator-motor 6. The current sensors 9 and 10 detect phase currents of the generator-motor 6.

The motor ECU 11 is composed of a computer system comprising a CPU (central processing unit) 11A, a ROM (read-only memory) 11B and a RAM (random access memory) 11C, as illustrated in FIG. 1. The CPU 11A reads out a computer program from the ROM 11B to perform processing shown in FIGS. 2 and 3, which dedicate to controlling the traction motor 1 and generator-motor 6. The ROM 11B functionally comprises a map MP used for the control.

Specifically the motor ECU 11 controls both the traction motor 1 and the generator-motor 6. The HV-ECU 12 calculates a torque command for the traction motor 1 based on an output signal of the accelerator pedal 13 and outputs the calculated torque command to the motor ECU 11. The boosting converter 14 controls DC (i.e. direct-current) electric power given and received between the battery 15 and the inverters 2 and 7. The boosting converter 14 increases the battery voltage of approximately 300V to a boosted DC voltage of approximately 700V which is applied to the inverters 2 and 7. The inverters 2 and 7 convert the received DC voltage into a three-phase AC (i.e. alternating-current) voltage, respectively.

The HV-ECU 12 outputs the torque command to the motor ECU 11 at predetermined communication intervals. This torque command corresponds to a torque value to be generated from the traction motor 1 in accordance with an operation amount of the accelerator pedal and/or a brake pedal. The motor ECU 11 obtains a motor rotational angle and a motor speed based on the information obtained from the rotor rotational position detector 3. Then, the motor ECU 11 calculates a current command corresponding to the torque command calculated by the HV-ECU 12. Then, the motor ECU 11 performs a feedback control of the output voltage of the first inverter 2, so as to eliminate a difference between current values of the d- and q-axes which are calculated based on this current command value and the phase currents of traction motor 1 obtained from the current sensors 4 and 5.

Although the motor ECU 11 is arranged by a microcomputer, it is possible to use a hardware circuit to arrange the motor ECU 11.

Control Operations

Figure 2:
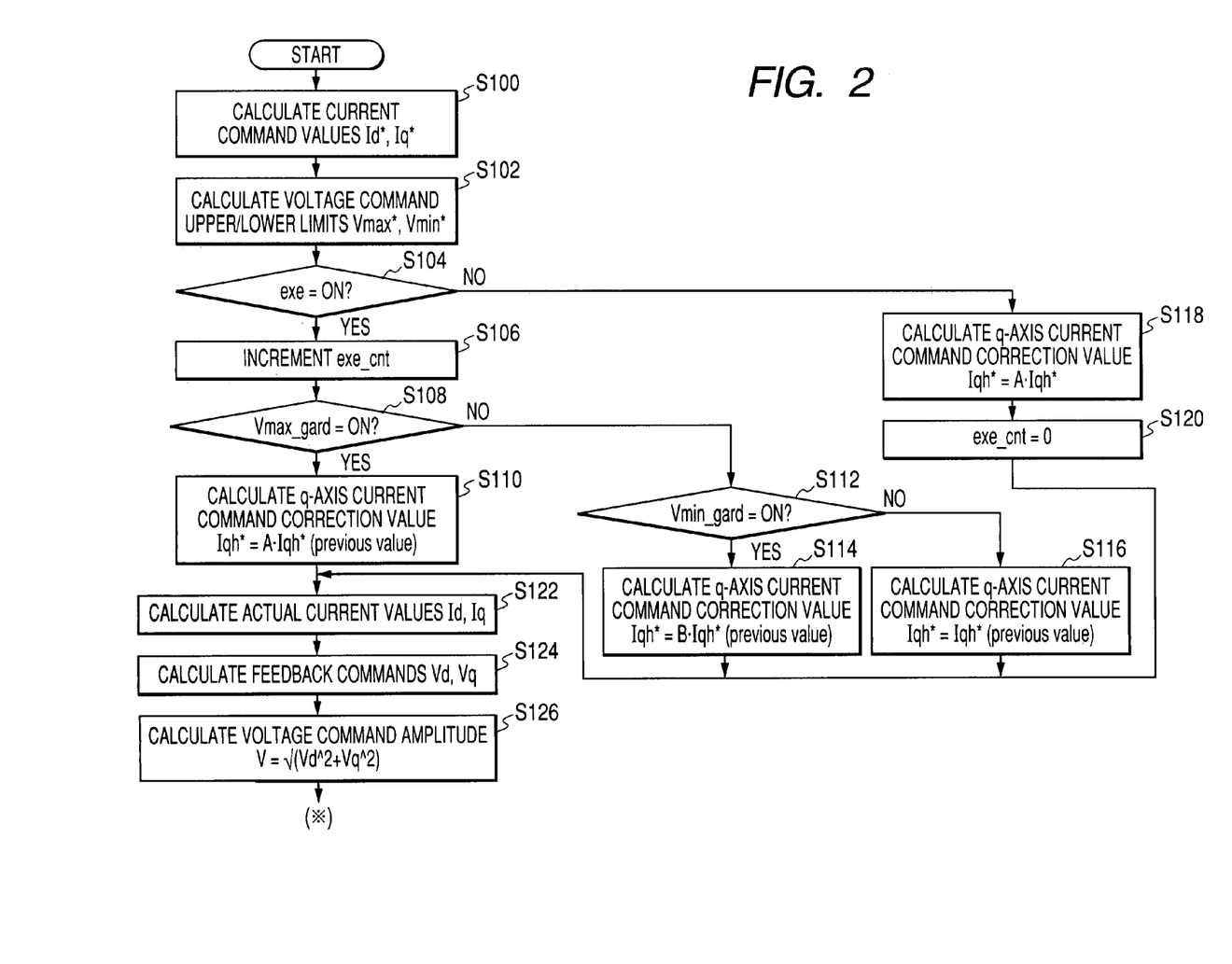
FIG. 2 is a flowchart showing a part of a traction motor control performed by a motor ECU shown in FIG. 1.
Figure 3:
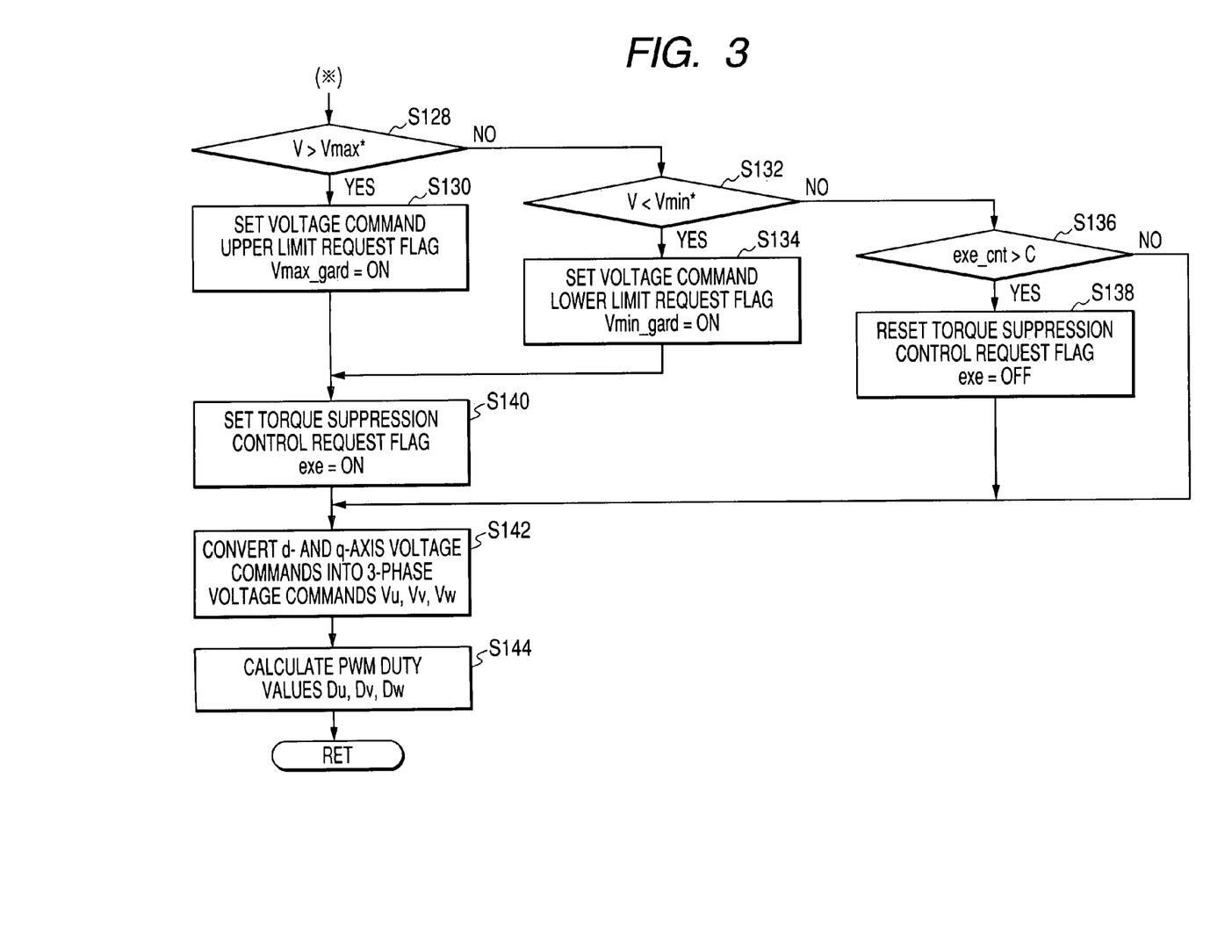
FIG. 3 is a flowchart showing the rest of the traction motor control performed by the motor ECU shown in FIG. 1.

Next, the control of the traction motor 1 performed by the motor ECU 11, especially a routine relating to the present invention, will be explained with reference to flowcharts shown in FIGS. 2 and 3.

First of all, the motor ECU 11 (i.e., CPU 11A) calculates current commands Id* and Iq* and voltage command upper/lower limits Vmax* and Vmin* based on the torque command given from the HV-ECU 12, a rotational speed, and an inverter voltage with reference to map data (data in the map MP) stored in ROM 11B (in steps S100 and S102). In this case, the rotational speed is a rotor speed of the traction motor 1. The inverter voltage is a DC power source voltage applied from the boosting converter 14 to the first inverter 2 and is also referred to as inverter power source voltage hereinafter. The ROM 11B of motor ECU 11 stores, as map data, mutual relationships among the torque command, the rotational speed, the inverter voltage, the current commands Id* and Iq*, and the voltage command upper/lower limits Vmax* and Vmin*. The current commands Id* and Iq* and the voltage command upper/lower limits Vmax* and Vmin* will be explained later in more detail.

Thereafter, the motor ECU 11 checks whether or not a later-described torque suppression control request flag 'exe' is ON (in step S104). When this torque suppression control request flag 'exe' is ON (i.e. YES in step S104), the motor ECU 11 increments a torque suppression control counter 'exe-cnt' (in step S106).

Next, the motor ECU 11 checks whether or not a voltage command upper limit request flag 'Vmax_gard' is ON (in step S108). When the voltage command upper limit request flag 'Vmax_gard' is ON (i.e. YES in step S108), the motor ECU 11 calculates a q-axis current command correction value Iqh* by multiplying a constant 'A' with a previous value of the q-axis current command correction value Iqh* (in step S110). Then, the motor ECU 11 proceeds to a step S122. The constant 'A' is in a range from 0 to 1. Accordingly, the q-axis current command correction value Iqh*, i.e. a torque component, is changed so as to reduce the absolute value of the torque.

When the voltage command upper limit request flag 'Vmax_gard' is OFF (i.e. NO in step S108), the motor ECU 11 checks whether or not a voltage command lower limit request flag 'Vmin_gard' is ON (in step S112). When the voltage command lower limit request flag 'Vmin_gard' is ON (i.e. YES in step S112), the motor ECU 11 calculates a q-axis current command correction value Iqh* by multiplying a constant 'B' with a previous value of the q-axis current command correction value Iqh* (in step S114). Then, the motor ECU 11 proceeds to the step S122. The constant 'B' is not smaller than 1. Accordingly, the q-axis current command correction value Iqh*, i.e. a torque component, is changed so as to increase the absolute value of the torque.

When the voltage command upper limit request flag 'Vmax_gard' and the voltage command lower limit request flag 'Vmin_gard' are OFF, the motor ECU 11 sets the q-axis current command correction value Iqh* to its previous value (in step S116). Then, the motor ECU 11 proceeds to the step S122.

When the torque suppression control request flag 'exe' is OFF (i.e. NO in step S104), the motor ECU 11 returns the q-axis current command correction value Iqh* to an ordinary value Iq* (in step S118). Then, the motor ECU 11 clears the torque suppression control counter 'exe-cnt' to 0 and proceeds to the step S122. In this case, it is preferable to set a time constant to realize a smooth return without causing torque variations.

In the step S122, the motor ECU 11 calculates actual current values Id and Iq based on respective phase currents of the motor obtained through A/D conversion of the output signals of the current sensors 4 and 5. Then, the motor ECU 11 calculates a d-axis voltage command Vd and a q-axis voltage command Vq according to the following feedback equations (in step S124). Then, the motor ECU 11 calculates a voltage command amplitude V based on the d-axis voltage command Vd and the q-axis voltage command Vq (in step S126).

$$Vd = kp \cdot (Id^* - Id) + \Sigma ki \cdot (Id^* - Id)$$

$$Vq = kp \cdot (Iqh^* - Iq) + \Sigma ki \cdot (Iqh^* - Iq)$$

Next, the motor ECU 11 checks whether or not the voltage command amplitude V is greater than the voltage command upper limit Vmax* obtained in the step S102 (in step S128). When the voltage command amplitude V is greater than the voltage command upper limit Vmax* (i.e. YES in step S128), the motor ECU 11 sets the voltage command upper limit request flag 'Vmax_gard' to ON (in step S130). Then, the motor ECU 11 sets the torque suppression control request flag 'exe' to ON (in step S140). Then, the motor ECU 11 proceeds to a step S142.

When the voltage command amplitude V is equal to or smaller than the voltage command upper limit Vmax* (i.e. NO in step S128), the motor ECU 11 checks whether or not the voltage command amplitude V is smaller than the voltage command lower limit Vmin* obtained in the step S102 (in step S132). When the command amplitude V is smaller than the voltage command lower limit Vmin* (i.e. YES in step S132), the motor ECU 11 sets the voltage command lower limit request flag 'Vmin_gard' to ON (in step S134) and then sets the torque suppression control request flag 'exe' to ON (in step S140). Then, the motor ECU 11 proceeds to the step S142.

When the voltage command amplitude V is in an ordinary range, i.e. in the range between the voltage command upper limit Vmax* and the voltage command lower limit Vmin*, the motor ECU 11 checks whether or not the torque suppression control counter 'exe_cnt' has exceeded a constant time C (in step S136). When the torque suppression control counter 'exe_cnt' has already exceeded the constant time C (i.e. YES in step S136), the motor ECU 11 resets the torque suppression control request flag 'exe' to OFF (in step S138). Then, the motor ECU 11 proceeds to the step S142.

In the step S142, the motor ECU 11 converts the d-axis voltage command Vd and the q-axis voltage command Vq obtained in the step S124 into corresponding three-phase voltage commands Vu, Vv and Vw. Then, the motor ECU 11 calculates duty values Du, Dv, and Dw of respective phase PWM voltages corresponding to the obtained three-phase voltage commands (in step S144). Then, the motor ECU 11 terminates this routine.

Effects of the Embodiment

As described above, this embodiment obtains voltage command upper/lower limits Vmax* and Vmin* based on the torque command entered from HV-ECU 12, the measured rotational speed, and the inverter voltage with reference to map data. Then, this embodiment calculates the current commands Id* and Iq* and obtains the voltage commands Vd and Vq for the feedback control, and checks whether or not the amplitude V obtained from these voltage commands Vd and Vq is within the range defined by the voltage command upper/lower limits Vmax* and Vmin*. When the amplitude V is within this range, this embodiment cancels the torque suppression control (i.e. the torque suppression control request flag 'exe' is reset to OFF). When the amplitude V is out of this range, this embodiment executes the torque suppression control (i.e. the torque suppression control request flag 'exe' is set to ON).

By executing this torque suppression control, the q-axis current command correction value Iqh* is corrected to a smaller value when the voltage command amplitude V is greater than the voltage command upper limit (Vmax*). On the other hand, the q-axis current command correction value Iqh* is corrected to a larger value when voltage command amplitude V is smaller than the voltage command upper limit (Vmax*). Thus, this embodiment calculates the d-axis and q-axis voltage commands Vd and Vq based on the corrected q-axis current command correction value Iqh*.

Accordingly, when the traction load entered to the wheels suddenly changes, for example, due to an abrupt change in the load friction coefficient, and accordingly even when the speed of the traction motor 1 and the motor voltage suddenly change, this embodiment can effectively prevent or suppress a suddenly change in the motor output and accordingly can maintain the drivability of an automotive vehicle.

More specifically, when the load friction coefficient suddenly reduces, the rotational speeds of the wheels and the rotational speed of traction motor 1 show abrupt increases, respectively. The counter electromotive force of the traction motor 1 (i.e. the motional electromotive force) increases and the terminal voltage of the traction motor 1 increases.

According to a conventional system, the motor ECU performs a feedback control for equalizing the current supplied to the traction motor 1 to a current command value (i.e. current feedback control). Through this feedback control, the generated torque of the traction motor 1 is converged to a command value. According to this conventional feedback control system, the q-axis voltage command Vq and the d-axis voltage command Vd are increased to suppress sudden reductions in the current which may occur due to increases in the counter electromotive force of the traction motor 1. As a result, the current supplied to the traction motor 1 is maintained at the current command value. The motor output abruptly increases by an amount equivalent to an abrupt increase in the motor voltage.

On the contrary, according to this embodiment, the motor ECU 11 checks whether or not the amplitude of a vector of the q-axis voltage command Vq and the d-axis voltage command Vd (i.e. the amplitude of the voltage command) corresponding to the terminal voltage of the traction motor 1 goes out of the range usually generated according to the driving conditions (torque command, rotational speed, and inverter voltage). When the amplitude of the vector goes out of this range, the motor ECU 11 adjusts the q-axis current relating to the motor torque so as to suppress this change. Thus, this embodiment can decrease the torque of traction motor 1 consumed for undesirably increasing the rotational speed of the traction motor 1 in the event that the load friction coefficient suddenly reduces. This embodiment can prevent the output of traction motor 1 from abruptly increasing and also prevent the rotational speed of traction motor 1 from abruptly increasing.

Regarding the torque component, a sudden reduction in the traction load will cause an excess of torque and will induce acceleration of the traction motor 1. On the other hand, a sudden increase in the traction load will cause a lack of torque and accordingly will induce deceleration of the traction motor 1. In this respect, this embodiment corrects the torque component by using the q-axis current command correction value Iqh* corresponding to the torque of the traction motor 1 and does not correct the d-axis current command value. Thus, this embodiment can bring the above-described effects without requiring complicated controls and calculations.

Modified Embodiment

From the above-described embodiment, it is understood that the q-axis voltage command Vq, or both the q-axis voltage command Vq and the d-axis voltage command Vd should be adjusted in such a manner that the motor voltage is in a predetermined range defined according to the driving conditions. Therefore, instead of correcting the q-axis current command Iq*, it is possible to adjust the q-axis voltage command Vq or the d-axis voltage command Vd according to other methods. For example, when the voltage command amplitude V is out of the range defined by the voltage command upper/lower limits Vmax* and Vmin*, it is possible to adjust the q-axis voltage command Vq by modifying the constant so that the deviation of the voltage command amplitude V can be reduced.

Modified Embodiment

Furthermore, instead of judging whether or not the motor voltage is out of the preferable voltage range defined by the upper/lower limits to perform the above-described control, it is possible to adjust the q-axis voltage command Vq and the d-axis voltage command Vd in such a manner that the detected d-axis voltage is in a predetermined range defined by the driving conditions. Or, it is possible to adjust the q-axis voltage command Vq and the d-axis voltage command Vd in such a manner that the detected q-axis voltage is in a predetermined range defined by the driving conditions.

Modified Embodiment

Although the above-described embodiment employs a boosting hybrid system shown in FIG. 1, the present invention can be also applied to any other known hybrid systems shown in FIG. 4 to FIG. 7.

Figure 4:
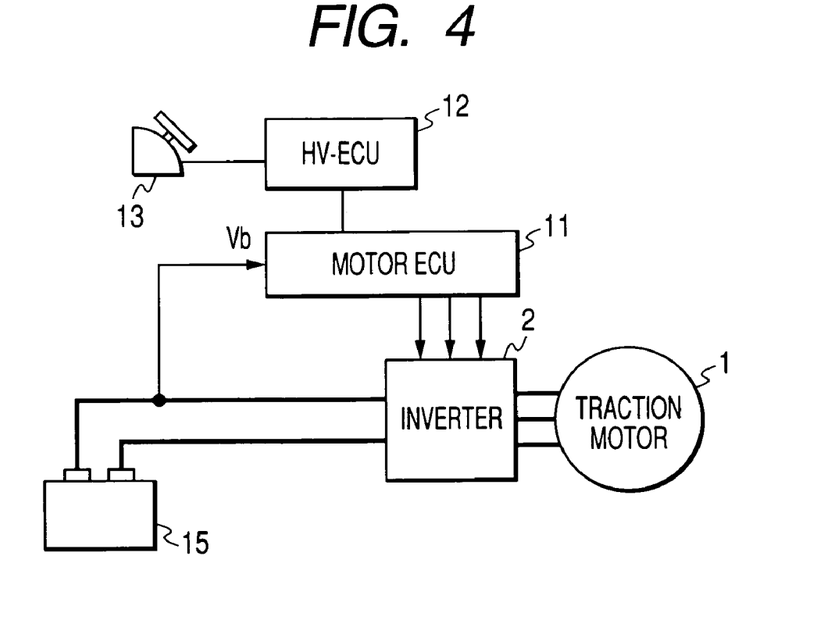
FIG. 4 is a block diagram showing an electric system for a vehicle equipped with a traction motor in accordance with another preferred embodiment of the present invention.
Figure 5:
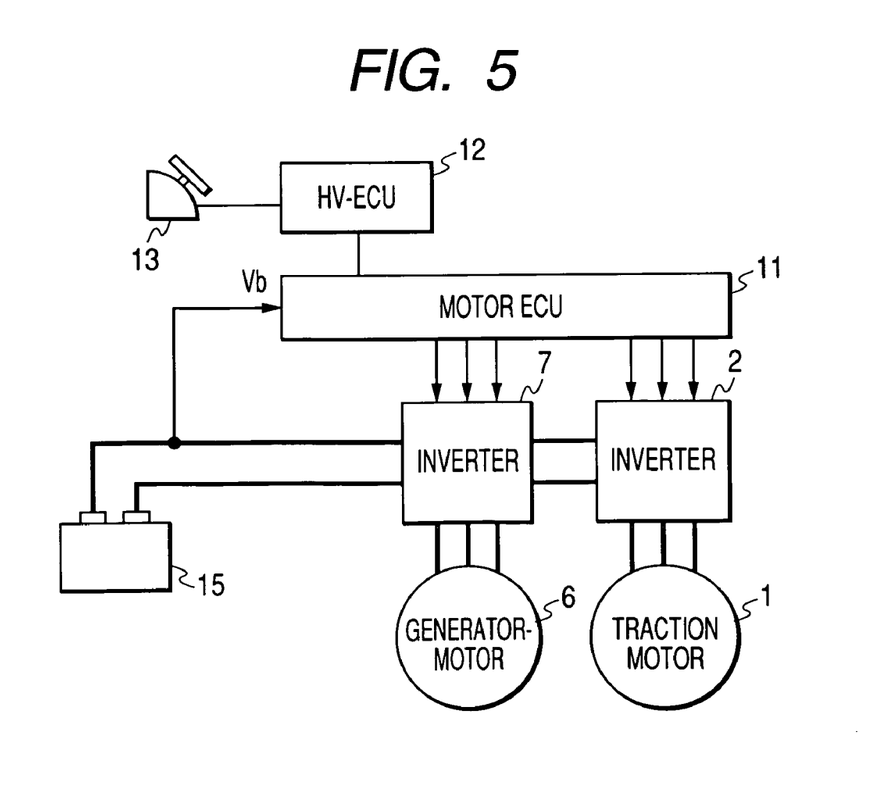
FIG. 5 is a block diagram showing an electric system for a vehicle equipped with a traction motor in accordance with another preferred embodiment of the present invention.
Figure 6:
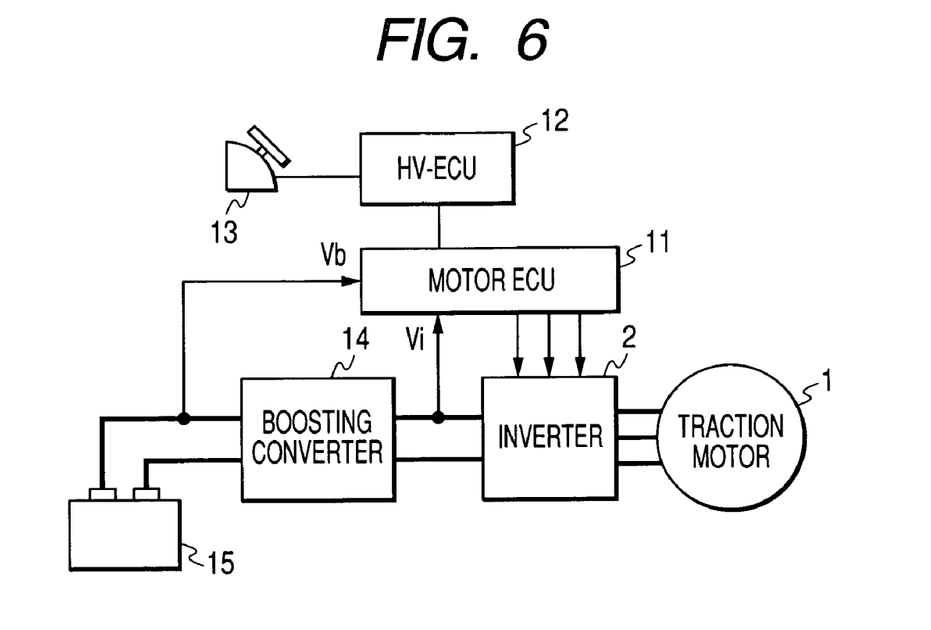
FIG. 6 is a block diagram showing an electric system for a vehicle equipped with a traction motor in accordance with another preferred embodiment of the present invention.
Figure 7:
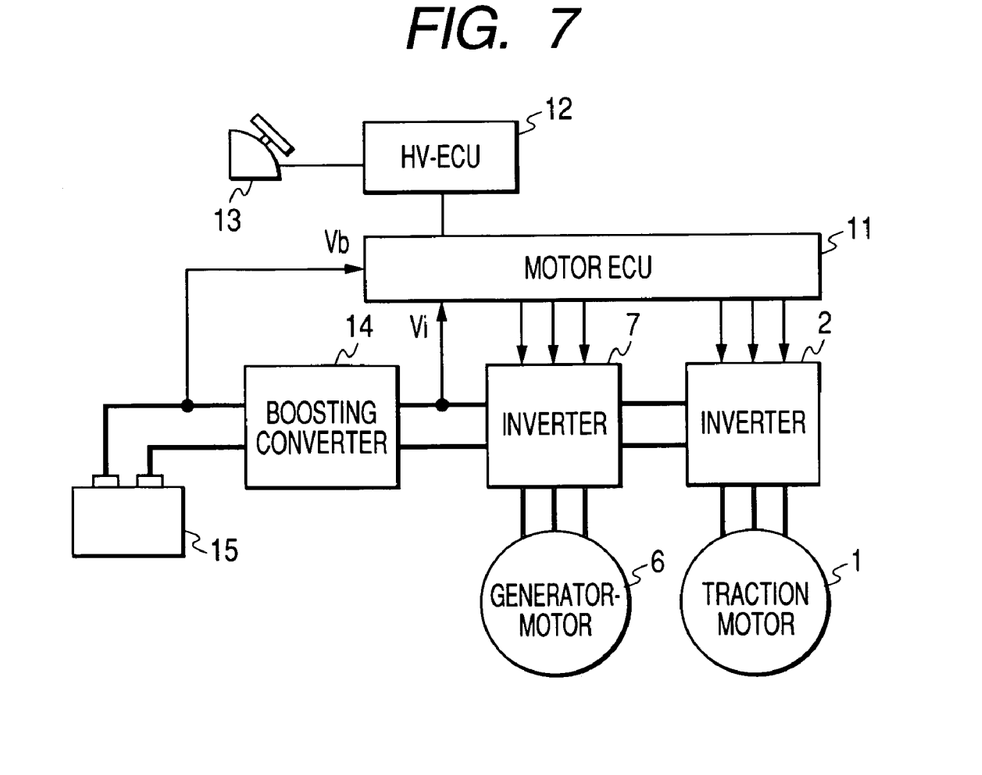
FIG. 7 is a block diagram showing an electric system for a vehicle equipped with a traction motor in accordance with another preferred embodiment of the present invention.

Roughly explaining, FIG. 4 shows the configuration of a motor drive system in which an HV-ECU 12, motor ECU 11, inverter 2 and one traction motor 1 are provided and electrically connected shown therein. The motor ECU 11 performs processing similar to the foregoing one. FIG. 5 shows the configuration of a motor drive system in which an HV-ECU 12, motor ECU 11, inverters 7 and 2, generator-motor 6, and traction motor 1 are provided and electrically connected shown therein. The motor ECU 11 performs processing similar to the foregoing one. Moreover, FIG. 6 shows the configuration of a motor drive system in which an HV-ECU 12, motor ECU 11, boosting converter 14, inverter 2, and traction motor 1 are provided and electrically connected shown therein. The motor ECU 11 performs processing similar to the foregoing one. FIG. 7 shows the configuration of a motor drive system in which an HV-ECU 12, motor ECU 11, inverters 7 and 2, boosting converter 14, generator-motor 6, and traction motor 1 are provided and electrically connected shown therein. The motor ECU 11 performs processing similar to the foregoing one.

Furthermore, the present invention can be applied to a secondary cell equipped electric vehicle, or to a fuel cell equipped electric vehicle. Moreover, the present invention can be applied to an automotive vehicle which is chiefly driven by an internal combustion engine but additionally equipped with an electric rotary machine used for torque assist or regenerative braking.

Modified Embodiment

According to the above-described embodiment, the relationships among the torque command, the rotational speed of traction motor 1, the power source voltage of the first inverter 2, and the voltage command upper/lower limits Vmax* and Vmin* are memorized as map data. The torque command entered from HV-ECU 12, measured values of the rotational speed, and the power source voltage are compared with these map data to obtain the voltage command upper/lower limits Vmax* and Vmin*. Alternatively, it is possible to obtain the voltage command upper/lower limits Vmax* and Vmin* with reference to the relationship between an electric amount representing the rotational speed (or relevant physical quantity) and the voltage command upper/lower limits Vmax* and Vmin*. According to this modified arrangement, the motor control can adequately involve the change in the motor voltage changing in accordance with the traction motor speed. Hence, it becomes possible to further enhance the above-described effects of the present invention.

Modified Embodiment

Furthermore, it is possible to obtain the voltage command upper/lower limits Vmax* and Vmin* with reference to the relationship among the electric power suppliable to the traction motor 1, the rotational speed of traction motor 1, and the voltage command upper/lower limits Vmax* and Vmin*. According to this modified arrangement, irrespective of a sudden change in the traction load, the electric power consumption in the motor (i.e. a product of the motor voltage and the motor current) does not exceed the electric power suppliable to the traction motor. Thus, the battery is not subjected to excessive loads.

Modified Embodiment

Figure 8:
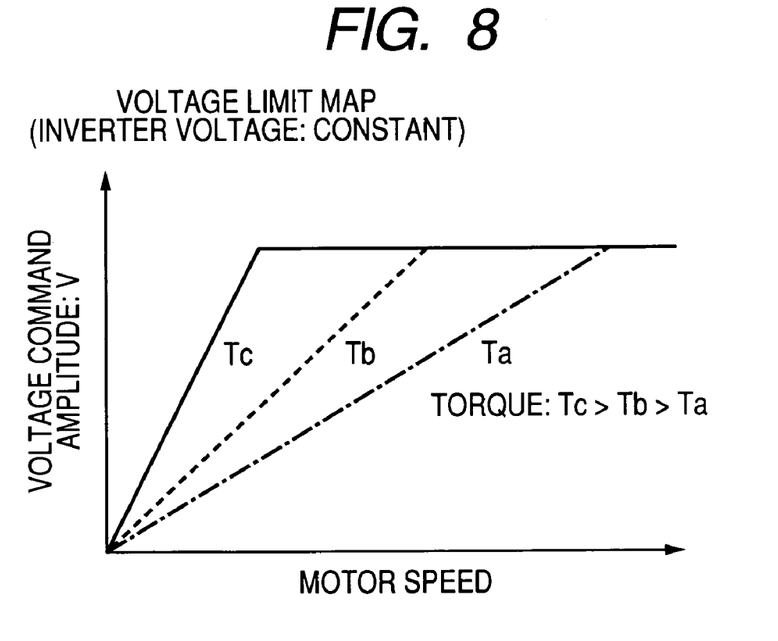
FIG. 8 is a map showing a relationship between a torque command, a motor speed, and a voltage command amplitude under a condition that the inverter voltage is constant.

Furthermore, it is possible to obtain the voltage command upper/lower limits Vmax* and Vmin* with reference to the relationship among the torque command value, the rotational speed of the traction motor, and the voltage command upper/lower limits Vmax* and Vmin*. FIG. 8 is a graph showing map data used in the step S102, which shows the relationship among the torque command, the rotational speed, and the voltage command upper/lower limits Vmax* and Vmin* under the condition that the inverter voltage is constant. In FIG. 8, Ta, Tb, and Tc are representative torque values. The ordinate axis of FIG. 8 represents a voltage command amplitude value V which corresponds to 0.5× (voltage command upper limit Vmax*+voltage command lower limit Vmin*).

According to this modified arrangement, a product of the torque command value and the rotational speed of the traction motor becomes a physical quantity relating to the traction power of the motor (i.e. the electric power consumption in the motor). Thus, regulating the motor voltage to its preferable voltage range makes it possible to regulate the electric power consumption in the motor within a preferable range. Thus, in addition to the effect of preventing the drivability of an automotive vehicle from being lessened due to an abrupt change of the electric power consumption in the motor, this modified embodiment can prevent the load of the power source system from increasing due to an increase of the electric power consumption in the motor.

Modified Embodiment

Figure 9:
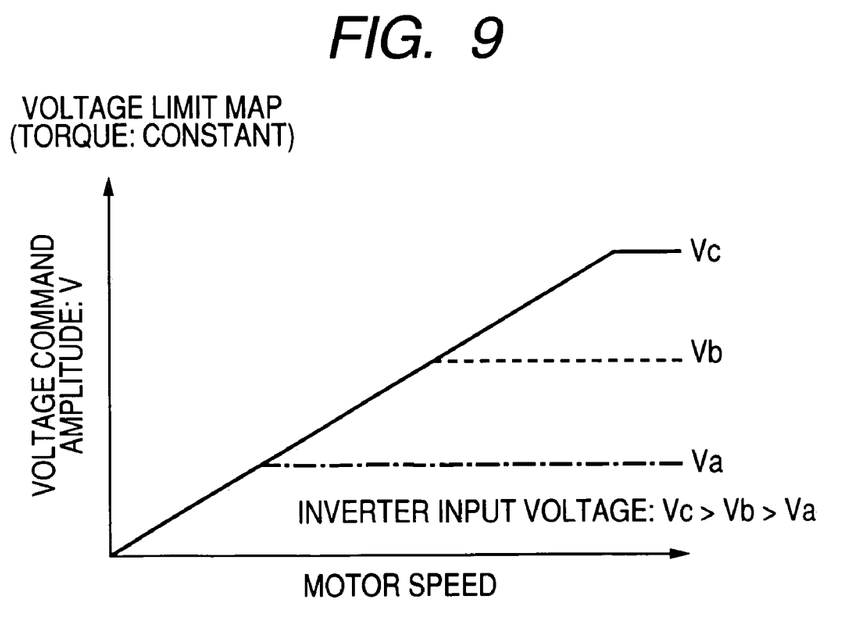
FIG. 9 is a map showing a relationship between the motor speed, the inverter voltage, and the voltage command amplitude under a condition that the torque command is constant.

Furthermore, it is possible to obtain the voltage command upper/lower limits Vmax* and Vmin* with reference to the relationship among the inverter voltage, the rotational speed of the traction motor, and the voltage command upper/lower limits Vmax* and Vmin*. FIG. 9 is a graph showing map data used in the step S102, which shows the relationship among the rotational speed, the rotational speed, and the voltage command upper/lower limits Vmax* and Vmin* under the condition that the torque command is constant. In FIG. 9, Va, Vb, and Vc are representative inverter voltage values. The ordinate axis of FIG. 9 represents a voltage command amplitude value V which corresponds to 0.5× (voltage command upper limit Vmax*+voltage command lower limit Vmin*).

According to this modified arrangement, it becomes possible to appropriately modify the voltage regulating range in accordance with the inverter voltage variation for adequately suppressing the drivability from being lessened by an abrupt change in the electric power consumption in the motor.

What is claimed is:

1. An apparatus for controlling a traction motor equipped in a vehicle, the traction motor being composed of alternating-current motor generating a driving torque necessary for running the vehicle, comprising:
    a detector detecting a rotational speed of the traction motor and a current supplied to the traction motor;
    a torque-command calculator calculating a torque command value based on information including acceleration information obtained in the vehicle;
    a current-command calculator unit calculating a current command value based on the torque command value and the detected rotational speed of the traction motor;
    a voltage-command calculator calculating a voltage command value based on a difference between the detected current and the current command value, the voltage command value allowing the difference to converge to zero and being applied to the traction motor;
    a memorizing unit previously memorizing information indicative of a relationship between an electric amount relating to driven conditions of the traction motor and a preferable voltage range to be applied to the traction motor;
    a regulator regulating the calculated voltage command value within the preferable voltage range, using the information indicative of the relationship; and
    an inverter producing a drive voltage corresponding to the regulated voltage command value and applying the produced drive voltage to the traction motor.

2. The apparatus in accordance with claim 1, wherein the electric amount includes either an electric amount representing the rotational speed of the traction motor or an electric amount associated with the rotational speed of the traction motor.

3. The apparatus in accordance with claim 2, wherein the electric amount further includes an electric power suppliable to the traction motor.

4. The apparatus in accordance with claim 2, wherein the electric amount further includes the torque command value.

5. The apparatus in accordance with claim 4, wherein the electric amount further includes a power source voltage of the inverter.

6. The apparatus in accordance with claim 1, wherein the current command value includes a q-axis current command value and
    the regulator comprises
    means determining whether or not the drive voltage to be applied to the traction motor is out of the preferable voltage range; and
    means adjusting the q-axis current command value when it is determined that the drive voltage to be applied to the traction motor is out of the preferable voltage range.

7. The apparatus in accordance with claim 6, wherein the adjusting means adjust the q-axis current command value by an amount of the q-axis current command value which is necessary to return the drive voltage to the preferable voltage range.

8. The apparatus in accordance with claim 1, wherein the current-command calculator, the voltage command calculator, the memorizing unit, and the regulator are incorporated in an electronic control unit for controlling the traction motor.

9. The apparatus in accordance with claim 8, wherein the electronic control unit has a CPU (central processing unit) functionally realizing the current-command calculator, the voltage command calculator, the memorizing unit, and the regulator.

10. A vehicle comprising:
    a traction motor composed of alternating-current motor generating a driving torque necessary for running the vehicle; and
    an apparatus for controlling the traction motor, comprising:
        a detector detecting a rotational speed of the traction motor and a current supplied to the traction motor;
        a torque-command calculator calculating a torque command value based on information including acceleration information obtained in the vehicle;
        a current-command calculator unit calculating a current command value based on the torque command value and the detected rotational speed of the traction motor;
        a voltage-command calculator calculating a voltage command value based on a difference between the detected current and the current command value, the voltage command value allowing the difference to converge to zero and being applied to the traction motor;
        a memorizing unit previously memorizing information indicative of a relationship between an electric amount relating to driven conditions of the traction motor and a preferable voltage range to be applied to the traction motor;
        a regulator regulating the calculated voltage command value within the preferable voltage range, using the information indicative of the relationship; and
        an inverter producing a drive voltage corresponding to the regulated voltage command value and applying the produced drive voltage to the traction motor.

11. The vehicle in accordance with claim 10, wherein the electric amount includes either an electric amount representing the rotational speed of the traction motor or an electric amount associated with the rotational speed of the traction motor.

12. The vehicle in accordance with claim 11, wherein the electric amount further includes an electric power suppliable to the traction motor.

13. The vehicle in accordance with claim 11, wherein the electric amount further includes the torque command value.

14. The vehicle in accordance with claim 13, wherein the electric amount further includes a power source voltage of the inverter.

15. The vehicle in accordance with claim 10, wherein the current command value includes a q-axis current command value and the regulator comprises means determining whether or not the drive voltage to be applied to the traction motor is out of the preferable voltage range; and means adjusting the q-axis current command value when it is determined that the drive voltage to be applied to the traction motor is out of the preferable voltage range.

16. A method of controlling a traction motor equipped in a vehicle, the traction motor being composed of alternating-current motor generating a driving torque necessary for running the vehicle, comprising:

detecting a rotational speed of the traction motor and a current supplied to the traction motor;

calculating a torque command value based on information including acceleration information obtained in the vehicle;

calculating a current command value based on the torque command value and the detected rotational speed of the traction motor;

calculating a voltage command value based on a difference between the detected current and the current command value, the voltage command value allowing the difference to converge to zero and being applied to the traction motor;

regulating the calculated voltage command value within the preferable voltage range to be applied to the traction motor, using information indicative of a relationship between an electric amount relating to driven conditions of the traction motor and the preferable voltage range;

producing a drive voltage corresponding to the regulated voltage command value; and applying the produced drive voltage to the traction motor.

* * * * *